United States Patent [19]

St. John et al.

[11] Patent Number: 4,527,193
[45] Date of Patent: Jul. 2, 1985

[54] IMAGE STORAGE SYSTEM

[75] Inventors: Karl M. St. John, Huntington Station; Dominic V. Zagardo, West Islip, both of N.Y.

[73] Assignee: Hazeltine Corporation, Commack, N.Y.

[21] Appl. No.: 431,542

[22] Filed: Sep. 30, 1982

[51] Int. Cl.³ .............................................. H04N 1/46
[52] U.S. Cl. .................................................... 358/76
[58] Field of Search ............................ 358/76, 78, 80

[56] References Cited

U.S. PATENT DOCUMENTS 4,350,997 9/1982 Yamada ................................. 358/78

Primary Examiner—Richard Murray
Attorney, Agent, or Firm—E. A. Onders; F. R. Agovino

[57] ABSTRACT

Video information from scanned separations is stored on a video tape recorder (VTR) after processing and formating. Video information stored on the tape of the VTR may be input into the memory of a separations previewer after decoding and processing. A controller controls the operation of switches which route the information and the VTR. A keyboard, control panel and printer interface with the controller.

4 Claims, 1 Drawing Figure

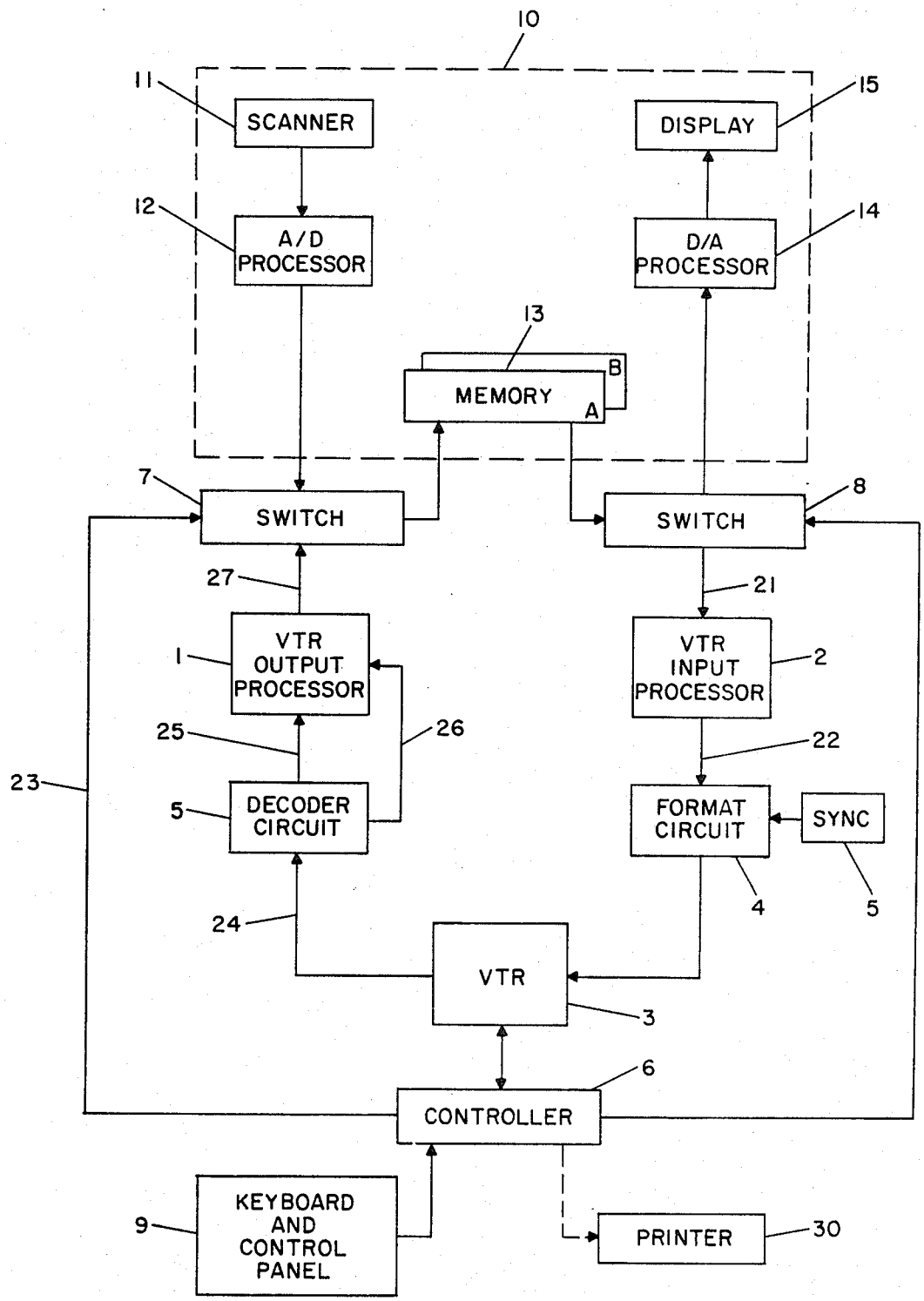

IMAGE STORAGE SYSTEM

BACKGROUND OF THE INVENTION

1. Field of the Invention

The invention relates to systems for storing images and, in particular, to a system for storing images generated by a separations previewer.

2. Description of the Prior Art

Separations previewers scan four separations which will be used for printing an image and store the video information provided by the scanning in a memory. The video information from the four separations is then combined and displayed for previewing. Therefore, separations previewers have been provided with a single memory for storing the video information resulting from the scanned separations. After previewing, the information in memory is replaced by video information from the next set of separations being scanned. Frequently, it is desireable to save the scanned image for comparison or reference purposes. The invention relates to an image storage system for use with a separations previewer for storing the video images.

SUMMARY OF THE INVENTION

It is an object of this invention to provide an image storage system which stores video information in the memory of a separations previewer.

The apparatus according to the invention is for use with a separations previewer. Such previewers have a scanner for scanning a separation, an analog-to-digital processor for developing digital signals corresponding to images on the separations, a memory for storing digital information corresponding to the digital signals, a digital-to-analog processor including a color computer for developing adjusted analog information corresponding to the digital information and a display for generating an image from the adjusted analog information. The apparatus according to the invention includes first means associated with the memory of the separations previewer for retrieving digital information stored in the memory and for storing digital information in the memory. Second means stores information in a given format on a medium. Third means converts the digital information retrieved by the first means into a format which is compatible with the given format of the second means. The third means also provides the converted digital information to the second means for storage on the medium. Fourth means converts the information stored on the medium of the second means into corresponding digital information and provides the corresponding digital information to the first means for storage in memory. Fifth means controls the operation of the first means and the second means.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

The FIGURE is a block diagram illustrating an image storage system according to the invention in combination with a separations previewer.

DETAILED DESCRIPTION OF THE INVENTION

As shown in the FIGURE, reference character 10 generally refers to a separations previewer such as the Hazeltine S/P 1620 and described in U.S. Pat. Nos. 3,131,252 and 3,800,071. Previewer 10 includes scanner 11 which scans the separations which are to be previewed. A/D processor 12 is an analog-to-digital converter and includes processing circuitry which processes the video signals provided by scanner 11 for storage in memory 13. The stored video information is then provided to D/A processor 14 which includes a digital-to-analog converter and processing circuitry so that the video information is displayed by display 15 (i.e. a cathode-ray tube).

Separations previewer 10 is used to preview four separations which will be used for printing an image. A corresponding image which is a preview of the image which will be printed by the four separations is provided by display 15. D/A processor 14 also includes a color computer which allows adjustment of the video signals in memory 13 to adjust a resulting image displayed by display 15. The information relating to the adjustments made by the color computer of processor 14 is then used to generate separations which will be used in the printing process.

Frequently, it is necessary to store the video information which is in memory 13 so that it may be used for comparison at a later date or may be used at a later time for processing. The invention relates to an image storage system which stores video information in memory 13 on a medium such as video tape.

The invention is connected previewer 10 between processor 12 and memory 13 by switch 7 and between memory 13 and processor 14 by switch 8. The purpose of switch 8 is to route information stored in memory 13 so that it may be stored in video tape recorder 3. The purpose of switch 7 is to route information which is stored in recorder 3 for storage into memory 13.

When an image in storage in memory 13 is to be stored on tape or other recording medium which is a part of recorder 3, an operator indicates on keyboard and control panel 9 the location on the tape where the image will be stored. Controller 6 analyzes the information from keyboard and control panel 9 and advances or otherwise controls the tape of recorder 3 so that the tape is in the proper position for recording. Controller 6 may be any state-of-the-art control apparatus for a magnetic recorder such as disclosed in U.S. Pat. No. 4,308,563, incorporated herein by reference. Controller 6 via control line 23 then switches switch 8 from previewer position P to record position R so that information in memory 13 is routed via line 21 to VTR input processor 2 which converts the parallel information provided by memory 13 into serial information. This serial information is provided to format circuit 4 via line 22. Circuit 4 inserts horizontal and vertical sync pulses provided by sych generator 31 into the information so that it is in the proper format for acceptance by recorder 3. Circuit 4 then routes the information with the inserted pulses to recorder 3. Generally, recorder 3 may be any state-of-the-art video tape recorder for recording video signals having horizontal and vertical sync pulses.

When an image on recorder 3 is being transferred into memory 13, keyboard and control panel 9 indicates such to controller 6 so that switch 7 is switched via control line 23 from preview position P to record position R to route information from recorder 3 into memory 13. In particular, the serial information in recorder 3 is provided via line 24 to decoder circuit 5 which decodes the digital information and isolates out the horizontal and vertical sync pulses. The serial digital information is provided via line 25 to VTR output processor 1 and the horizontal and vertical sync pulses are provided via line 26 to processor 1 for timing purposes. The processed digital information is then provided in a parallel format via line 27 to switch 7 in position R for storage into memory 13.

Memory 13 may consist of two or more memory banks of information with each memory bank having associated switches which interface the bank with recorder 3. As a result, the separations previewer 10 may be used while information is being transferred from one of the banks of memory 13 to recorder 3 or visa versa. For example, if memory 13 comprises bank A and bank B of random access memory, a video image stored in bank B may be processed by previewer 10 while an image in bank A is being transferred for storage into recorder 3 or an image in recorder 3 is being transferred into bank A. In this example, the switches associated with bank A would be in record position R and the switches associated with bank B would be in preview position P.

The system may be provided with an optional printer 30 which is associated with controller 6. Controller 6 would provide printer 30 with printing signals relating to the identity and location of the data which has been stored or which is about to be stored on recorder 3.

The purpose of the horizontal and vertical sync pulses provided by sync pulse generator 31 is to format the digital information for recording on recorder 3. Generally, commercial video tape recorders only record analog information which is in a video signal format. Therefore, the digital information in memory 3 must be combined with horizontal and vertical sync pulses so that it appears to be video analog information which is properly stored by recorder 3.

In another form of the invention, the signals after processing in the color computer of the separations previewer may be stored in a storage system as discussed herein. In this case, the corrected analog video signals would be taken from a point following the color computer but before display 15. The corrected analog video signals would be digitized, stored in a buffer memory, processed and formatted as discussed previously, and recorded in VTR 3. The signals would then be retrievable for viewing on the separations previewer 10 for comparison purposes and for customer approval.

The storage module (i.e. tape cassette) could also be transported and the stored images viewed on a remote display if that display is equipped with the decoder circuit, the VTR output processor and the buffer memory as discussed previously.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for use with a separations previewer having a scanner for scanning a separation, an analog-to-digital processor for developing digital signals corresponding to images on the separations, a memory for storing digital information corresponding to the digital signals, a digital-to-analog processor including a color computer for developing adjusted analog information corresponding to the digital information and a display for generating an image from the adjusted analog information, said apparatus comprising:
    a. first means associated with the memory of the separations previewer for retrieving digital information stored in the memory and for storing digital information in the memory;
    b. a video tape recorder for storing information in a video format on a video tape;
    c. third means for converting digital information retrieved by said first means into a format compatible with the video format and for providing said converted digital information to said video tape recorder for storage on the video tape, said third means including means for adding synchronization pulses to the digital information retrieved by said first means;
    d. fourth means for converting information stored on the video tape of said video tape recorder into corresponding digital information and for providing said corresponding digital information to said first means for storage in the memory; and
    e. fifth means for controlling the operation of said first means and said video tape recorder.

2. The apparatus of claim 1 further including a keyboard and control panel associated with said fifth means and a printer associated with said fifth means.

3. The apparatus of claim 2 wherein said fourth means comprises a decoder circuit.

4. The apparatus of claim 3 wherein said first means comprises a first switch between the analog-to-digital processor and the memory and means for converting the serial information provided by the video tape recorder to parallel information; and a second switch between the memory and the digital-to-analog processor and means for converting parallel information provided by said memory into serial information.

* * * * *